UNITED STATES PATENT OFFICE.

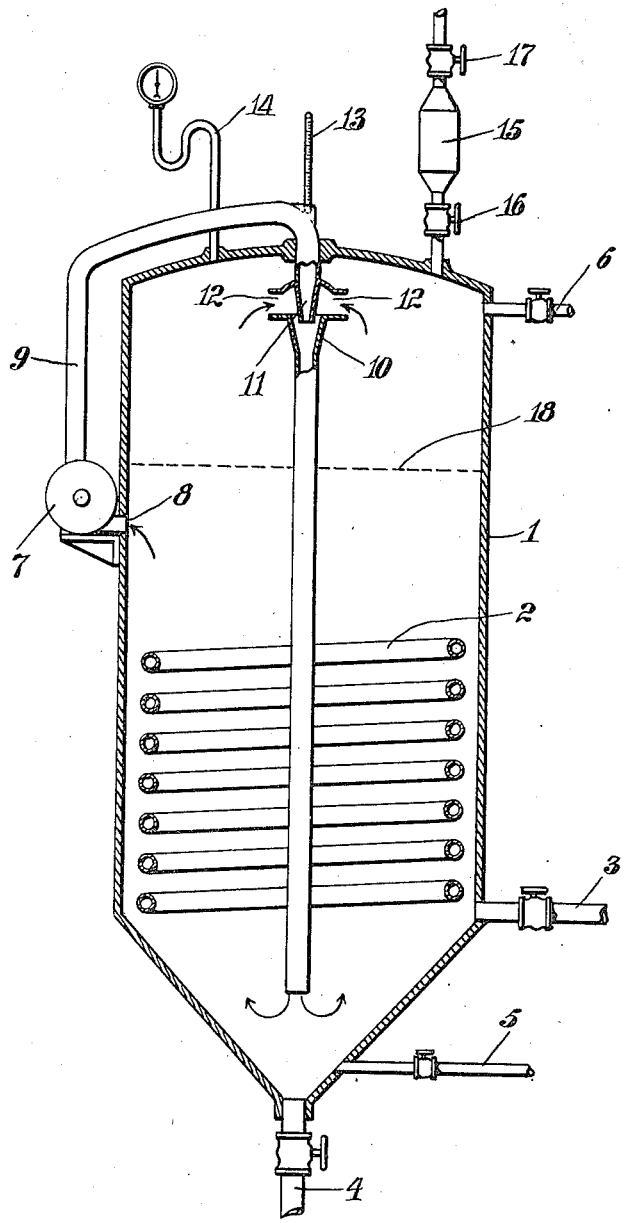

CARLETON ELLIS, OF MONTCLAIR, NEW JERSEY.

PROCESS OF MAKING HARDENED FAT AND THE LIKE.

1,059,720.  Specification of Letters Patent.  Patented Apr. 22, 1913.

Application filed December 21, 1912. Serial No. 737,942.

*To all whom it may concern:*

Be it known that I, CARLETON ELLIS, a citizen of the United States, and resident of Montclair, in the county of Essex and State of New Jersey, have invented certain new and useful Improvements in Processes of Making Hardened Fat and the Like, of which the following is a specification.

This invention relates to the process of hydrogenating oily material and the like, containing unsaturated bodies, and relates in particular to the treatment of a body of oil with hydrogen or a hydrogen-containing gaseous medium, involving passage of the gas preferably in relatively fine bubbles through said body of oil; all as more fully hereinafter described and claimed.

It has been proposed to hydrogenate oil by passing a strong current of hydrogen therethrough in the presence of a very finely divided catalyzer such as metallic nickel and the like, this having been advanced among others by Normann, Eng. Patent No. 1515, of 1905. Also it has been proposed to make use of pressure in accelerating the rate of hydrogenation as has been repeatedly advanced by Ipatieff, Day and others.

In the present invention I make use preferably of two very common expedients, namely that of stirring a liquid by means of a gas passing through it and the use of pressure to accelerate reactions between liquids and gases; but I embody with these aforesaid common expedients a certain novel method of operation as will hereinafter be described.

As I have heretofore stated (*Journal of the Society of Chemical Industry,* 1912, page 1162) it does not appear needful to agitate the catalyzer to the extent heretofore supposed. Contrary to the opinion entertained by many there appears to be no occasion to agitate the catalyzer primarily for the purpose of contacting it with hydrogen. Once the catalyzer is wetted with the oil there can no longer be any actual contact with the gas. Hydrogen reaches the catalyzer seemingly only through solution in the oil. The forces of adhesion effectually seal the catalyzer surface from the gas and no measure of agitation by ordinary mixing apparatus will dislodge the film of oil. Of course agitation secures the rapid replacement of more saturated by less saturated portions of the oil, but this replacement under certain conditions may proceed just as rapidly, simply by diffusion.

The effect of agitation is in fact regarded by some as undesirable just as in the manufacture of soda water it is found that whipping of the water contained in the gas has a tendency to drive the gas from solution, whereas gentle agitation under pressure effects rapid saturation. In the same manner violent agitation of the oil with hydrogen gas, such as is sometimes resorted to, tends to whip the gas from the oil and does not permit of its effective solution therein and in consequence of the fact that the gas can get to the catalyzer substantially only by way of the oil it follows that the rate of hydrogenation or the desirable low temperature required cannot take place effectively.

By the present invention I may subject the oil to a pressure which is frequently variable in amount, although the variation is preferably slight and definite and of a positive nature. To this end I may expose a body of oil to an atmosphere of hydrogen and cause a portion of the oil to pass preferably under a substantial pressure through an injector in such a manner that the hydrogen gas is drawn into contact with the oil so that without the formation of a powerful spray or violent mechanical agitation the hydrogen is brought into solution by the oil to the required degree. During the period of induction the oil and gas are subjected momentarily to reduced pressure which causes the elimination more or less of tiny or microscopic bubbles of hydrogen which become attracted to the particles of catalyzer and adhere to same by adhesive forces until absorbed through the film of oil by the catalyzer and then given back to the oil as fixed hydrogen. Thus I preferably maintain conditions such that the particles of catalyzer carry a zone of nearly saturated or even supersaturated solution of hydrogen in the oil around about each particle.

The catalyzer which I may employ is that of Sabatier, consisting of metallic nickel supported on a carrier of pumice or other similar granular material including fullers' earth and the like and in preparing this material I may simply employ the process of Sabatier, namely that of wetting the fullers' earth or pumice with nearly saturated solution of nickel nitrate, drying, igniting and then reducing in a current of hydrogen; or I may employ the following method of preparing the catalyzer which consists in taking the material prepared in the foregoing manner and after reduction while still hot exposing to air to reoxidize and then reducing a second time so as to secure a doubly reduced material which contains a larger proportion of metallic nickel than is possible to obtain by a single reduction, especially at the working temperatures desired for catalyzer reduction, namely 300 to 350° C. I do not, however, find the use of highly porous supporting bodies as desirable as those which are denser. Pumice and keiselguhr are so porous that they absorb vast quantities of the nickel solution in to the interior pores and once in there this is sealed by the oil from further activity. Thus probably one-half of the nickel used is rendered ineffective or inefficient. For practical operation under such circumstances such inert carriers are therefore obviously often undesirable. Charcoal material and the like, of an active character, may be used in carrying out the process of the present invention. Charcoal has the property of absorbing hydrogen and often exhibits desirable catalytic properties.

In carrying out my process I make use of the following arrangement of apparatus: The oil is placed in a hydrogenating tank which is preferably heated by a steam coil and hydrogen is introduced into this tank under any suitable pressure, it being desirable to heat the oil and blow hydrogen through it for a short time to remove moisture and air. Catalyzer is prepared in a separate chamber consisting, for example, of a drum which is caused to rotate in a receptacle heated to 300 or 350° C. while hydrogen is passed over same. The drum of catalyzer is then tightly closed, carried to the hydrogenation tank, screwed into a threaded opening in the tank and the contents are allowed to fall into the receptacle without contact with the air, as even momentary exposure to air is almost fatal of good results. Oil is then heated in the hydrogenation tank and a portion passed in cyclic fashion through the injectors so as to introduce hydrogen from the top of the tank into the bottom of the tank and the hydrogen entering in this way at the bottom of the tank is so mingled with the oil that relatively fine bubbles of the oil are formed particularly conducive to rapid absorption. In the inductor it is desirable to avoid the formation of spray and the stream of oil passing through inductor should therefore be as nearly solid or integral as possible so as to avoid separating the gas in solution in the oil.

It is desirable oftentimes to withdraw from the hydrogenation tank a slow stream of hydrogen in order to gradually relieve the gas of its spent portion; fresh gas, of course, being fed into the apparatus. The spent gas is well suited for reducing catalyzer, especially if it is somewhat purified. The purified spent gas may be used for making the first reduction of the catalyzer and the final reduction may be made with pure hydrogen.

The accompanying drawing shows in vertical section apparatus suited for carrying out the present invention.

In the drawing 1 is a treating receptacle or tank having the steam heating coils 2 and oil inlet and outlet 3.

4 is a draw off at the bottom of the conical base.

5 is an inlet for hydrogen gas.

6 is a gas exit.

7 is a pump placed below the oil level 18 and having an inlet 8.

9 is a pipe leading from the pump 7 to the injector 10 having the exit pipe 11 and gas inlets 12.

13 is a thermometer and 14 a pressure gage.

15 is a catalyzer container having the valves 16 and 17.

In the operation of the foregoing somewhat diagrammatically shown apparatus, hot or cold oil is placed in the tank to fill same to about the level indicated. The temperature is raised or maintained at about 300° F. and a quantity of hydrogen or a hydrogen containing gas is entered at 5 to flush out all air from the tank and appurtenances. To aid this, the pump 7 is put in operation. When the air has been removed a charge of catalyzer contained in the capsule or container 15 is entered, the pump 7 set in motion or continued in motion and hydrogen or a hydrogen containing gas passed into the receptacle, to replace the portions absorbed or to create any suitable pressure.

While I do not find it necessary or desirable with the present apparatus to use the high pressures employed by Ipatieff, I may employ pressures of 2 or 3 atmospheres or so which has a tendency to steady the oil stream passing through the inductor. The precise operation of the inductor is of importance. Oil carrying catalyzer is segregated or withdrawn from the main body of oil, is pumped through the pipe 9 and enters the inductor by the opening 11 as an integral stream. As this stream passes through the inductor, hydrogen is drawn in and is carried along the depending tube to the lower part of tank where both oil and gas emerge, the latter to bubble through the oil pool and the former to, in the course of time, again pass through the inductor via the pump 7. No powerful circulation of the oil is required and the preferably gentle flow of oil and gas along the cyclic path thus created affords full opportunity for solution of gas in the oil without danger of whipping out of the oil in a not readily available form the dissolved gas content. Further-more, the decrease in pressure at the time of induction apparently tends to cause microscopic bubbles of hydrogen to collect on the particles of catalyzer and thus to be taken up readily in contrast with the dislodging effect caused by spraying or whipping the oil under certain circumstances.

By treatment of unsaturated fats and oils, such as tallow, oleostearin, cotton, corn, rape, peanut, castor, linseed, Chinese wood, fish, whale and similar oils with hydrogen and the like in the presence of a catalyzer such as nickel or palladium, a hardening of the oil results through formation of stearins and other solid bodies. Certain waxes may be hardened in a similar manner. By the use of oxygen and hydrogen the hydroxy compounds may be secured.

To recapitulate, the present invention relates to the process of treating oily material and the like containing unsaturated bodies which comprises confining a body of said material, admixed with a catalyzer, in juxtaposition to a hydrogen-containing gaseous medium, in segregating from said body portions thereof, as by continuously impelling (withdrawing) from said body a stream of oil, in passing such portions or said stream through some portion of said gaseous medium whereby entrainment of some portion of the latter occurs, and in causing said segregated oil and gas preferably in the form of a stream to enter said body of oil beneath the surface thereof preferably in a continuous manner; whereby said gas is disseminated through said body of oil, and saturation of at least a portion of said unsaturated bodies is effected.

What I claim is:

1. The process of treating oily material and the like containing unsaturated bodies which comprises confining a body of said material, admixed with a catalyzer, in juxtaposition to a hydrogen-containing gaseous medium, in withdrawing from said body portions thereof, in passing such portions through some portion of said gaseous medium; whereby entrainment of some portion of the latter occurs, and in causing the withdrawn oil and entrained gas to enter said body of oil beneath the surface thereof; whereby saturation of at least a portion of said unsaturated bodies is effected.

2. The process of treating oily material and the like containing unsaturated bodies which comprises confining a body of said material, admitted with catalyzer, in juxtaposition to a hydrogen-containing gaseous medium under pressure, in continuously withdrawing from said body portions thereof, in passing such portions through some portion of said gaseous medium; whereby entrainment of some portion of the latter occurs, and in causing the withdrawn oil and entrained gas to enter said body of oil at a point well beneath the surface thereof; whereby saturation of at least a portion of said unsaturated bodies is effected.

Signed at Montclair in the county of Essex and State of New Jersey this 12th day of December A. D. 1912.

CARLETON ELLIS.

Witnesses:
B. M. ELLIS,
F. CARBUTT.